United States Patent [19]

Pham et al.

[11] Patent Number: 4,751,280
[45] Date of Patent: Jun. 14, 1988

[54] PREPARATION OF EPOXY RESINS AND AFTERTREATMENT OF RESIN VIA DRYING, FILTERING AND WASHING

[75] Inventors: Ha Q. Pham, Richwood; Benny B. Gammill, Angleton, both of Tex.

[73] Assignee: The Dow Chemical Company, Midland, Mich.

[21] Appl. No.: 87,016

[22] Filed: Aug. 19, 1987

Related U.S. Application Data

[63] Continuation-in-part of Ser. No. 918,739, Oct. 14, 1986, abandoned.

[51] Int. Cl.[4] ............................................... C08G 59/06
[52] U.S. Cl. ...................................... 528/95; 525/507; 525/359.2; 528/405; 528/99; 549/517
[58] Field of Search ............... 525/507, 359.2; 528/95, 528/405, 99; 549/517

[56] References Cited

U.S. PATENT DOCUMENTS

| | | | |
|---|---|---|---|
| 3,145,191 | 8/1964 | Perfetti | 528/95 |
| 3,876,615 | 4/1975 | Vargin et al. | 549/517 |
| 4,132,718 | 1/1979 | Vargin et al. | 549/517 |
| 4,499,255 | 2/1985 | Wang et al. | 528/95 |

Primary Examiner—Earl Nielsen
Assistant Examiner—Frederick Krass

[57] ABSTRACT

Epoxy resins are prepared by (a) adding an alkali metal hydroxide solution to a mixture containing an excess of an epihalohydrin, a phenolic hydroxyl-containing or an aromatic amine-containing compound and an organic solvent which codistills with water and the epihalohydrin, (b) conducting the reaction under reduced pressure while continuously removing water by codistillation, (c) separating the water from the distillate and returning the epihalohydrin and organic solvent to the reaction mixture, (d) drying the reaction mixture, (e) removing insoluble materials by suitable mechanical separation means, (f) washing the resin/epihalohydrin-/organic solvent mixture with water so as to substantially remove water soluble materials, (g) drying the epihalohydrin/resin mixture, and (h) recovering the resultant epoxy resin from the resin/epihalohydrin/organic solvent mixture by any suitable means. This process produces an epoxy resin which is low in hydrolyzable halide and total halide.

16 Claims, No Drawings

PREPARATION OF EPOXY RESINS AND AFTERTREATMENT OF RESIN VIA DRYING, FILTERING AND WASHING

CROSS-REFERENCE TO RELATED APPLICATION

This application is a continuation-in-part of application Ser. No. 918,739 filed Oct. 14, 1986 now abandoned.

BACKGROUND OF THE INVENTION

The present invention pertains to the preparation of glycidyl derivatives of aromatic compounds containing an active hydrogen atom reactive with an epihalohydrin.

The preparation of glycidyl ethers by the reaction of an aromatic hydroxyl-containing compound with epihalohydrin in the presence of a base is well known as disclosed by Lee and Neville in HANDBOOK OF EPOXY RESINS, McGraw-Hill, 1967. Because of increased material costs and since in most instances, the reaction is conducted in excess epihalohydrin, any increase in epihalohydrin yields provide for a considerable economy in manufacturing costs. Also, particularly when the epoxy resin is to be employed in electrical applications, it is desirable that the epoxy resin have low hydrolyzable halide and low total ionic halide levels. The present invention provides an efficient process for maximizing epihalohydrin yields and also produces epoxy resins low in hydrolyzable halide and total halide.

SUMMARY OF THE INVENTION

The present invention pertains to an improvement in a process for the preparation of epoxy resins which comprises reacting a molar excess of at least one epihalohydrin with at least one aromatic compound containing an active hydrogen atom reactive with an epihalohydrin in the presence of an organic solvent or mixture of organic solvents, an alkali metal hydroxide and optionally in the presence of a catalyst for the reaction between the aromatic active hydrogen-containing compound and the epihalohydrin while controlling the concentration of water in the reaction mixture; wherein the improvement resides in (1) after completion of the reaction, drying the reaction mixture at conditions which do not remove substantial quantities of unreacted epihalohydrin until the concentration of water is equal to or less than about 2 percent by weight:

(2) removing insoluble materials from the reaction mixture by any suitable mechanical solid separation means thereby forming a resin/epihalohydrin/organic solvent mixture essentially free of insoluble material:

(3) washing the resin/epihalohydrin/organic solvent mixture with water, so as to remove water soluble materials:

(4) drying the resin/epihalohydrin/organic solvent mixture to a water content equal to or less than about 2 percent by weight:

(5) and recovering the resultant epoxy resin from the resin/epihalohydrin/organic solvent mixture by any suitable means.

Another aspect of the present invention pertains to a process for the preparation of epoxy resins which process comprises (A) continuously or incrementally adding an aqueous alkali metal hydroxide solution over a period of from about 0.5 to about 20, suitably from about 1 to about 10, more suitably from about 1 to about 6, most suitably from about 1.5 to about 3, hours to a mixture containing (1) at least one aromatic compound containing at least one active hydrogen atom reactive with an epihalohydrin, (2) at least a molar excess of at least one epihalohydrin and (3) at least one organic solvent which codistills with water and epihalohydrin at a temperature below the boiling point of the lowest boiling compound among the components in the reaction mixture at the pressure employed or at least one organic solvent which has a boiling point above the temperature at which epihalohydrin and water codistill at the temperature and pressure employed or a combination of such solvents;

(B) conducting the reaction under a reduced pressure sufficient to provide a distillate with a boiling point of from about 35° C. to about 90° C., suitably from about 40° C. to about 85° C., more suitably from about 45° C. to about 75° C., most suitably from about 50° C. to about 70° C., while continuously removing water by means of codistillation with epihalohydrin and solvent at a rate such that the water content in the reaction mixture is less than about 6, suitably from about 0.3 to about 5, more suitably from about 0.5 to about 4, most suitably from about 0.8 to about 2 percent by weight;

(C) separating the water from the distillate and returning the epihalohydrin and organic solvent to the reaction mixture;

(D) drying the reaction mixture at conditions which do not remove substantial quantities of unreacted epihalohydrin until the concentration of water is equal to or less than about 2, suitably equal to or less than about 1.5, more suitably equal to or less than about 1, most suitably equal to or less than about 0.2, percent by weight;

(E) removing insoluble materials from the reaction mixture by any suitable mechanical solid separation means thereby forming a resin/epihalohydrin/organic solvent mixture essentially free of insoluble material;

(F) washing the resin/epihalohydrin/organic solvent mixture with water so as to remove water soluble materials;

(G) drying the resin/epihalohydrin/organic solvent mixture to a water content equal to or less than about 2, suitably equal to or less than about 1.5, more suitably equal to or less than about 1, most suitably equal to or less than about 0.2, percent by weight; and (H) recovering the resultant epoxy resin from the resin/epihalohydrin/organic solvent mixture by any suitable means.

DETAILED DESCRIPTION OF THE INVENTION

Hydrolyzable halide is defined herein as any combination of halogen and hydroxyl groups on adjacent carbon atoms. Total halide is defined herein as hydrolyzable halide plus any aliphatic halides not adjacent to a hydroxyl group.

The epihalohydrin can be employed in an amount of at least about 1, suitably from about 2 to about 20, more suitably from about 4 to about 12, most suitably from about 6 to about 10, molar excess of epihalohydrin above that required to react stoichiometrically with the active hydrogen-containing material.

The aqueous alkali metal hydroxide solution is employed in a concentration of from about 10 to about 60, suitably from about 20 to about 55, more suitably from about 30 to about 50, most suitably from about 40 to about 50, percent alkali metal hydroxide by weight.

The reaction is conducted under reduced pressure so as to form a co-distillate of water, epihalohydrin and the organic solvent at the desired reaction temperature.

If the reaction is conducted at temperatures below about 35° C., the time required to complete the reaction becomes excessive and it becomes difficult to condense and manage the distillate in a manner conducive to optimum reaction composition.

If the reaction is conducted at temperatures above about, 90° C., large amounts of insoluble polymers are formed, raw material yields are lowered and processing difficulties occur.

If the reaction is conducted such that the concentration of water in the reaction mixture exceeds about 6 percent by weight, hydrolysis of the epihalohydrin becomes dominant and a product very high in hydrolyzable halide is obtained and epihalohydrin yields are decreased.

If the insoluble materials are removed from the resin-/epihalohydrin/organic solvent composition containing more than about 2% water by weight, the inorganic salt and alkali metal hydroxide do not readily precipitate and the hydrolyzable chloride content of the product would be high due to the reverse reaction of resin, salt and water.

If the insoluble materials are not removed from the resin/epihalohydrin/organic solvent composition prior to water washing and removal of the epihalohydrin and organic solvent, the hydrolyzable halide content of the product tends to increase, water washing and phase separation is more difficult, distillation equipment tends to become fouled with solid deposits, raw material yields tend to decrease and product quality becomes difficult to control.

The insoluble materials which are removed in the step identified as (E) are usually unreacted alkali metal hydroxide, by-product salts, epihalohydrin polymers and resin polymers.

The insoluble materials can be removed by any suitable mechanical means such as, for example, filtration, centrifugation, combinations thereof and the like.

Suitable compounds which can be employed to react with the epihalohydrin to prepare the corresponding epoxy compounds include, for example, phenols, bisphenols, novolac resins, polyvinyl phenols, the corresponding amine-containing and carboxyl-containing materials. Suitable such materials include but are not limited by those represented by the following formulas I, II, III, IV or V:

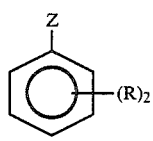

I.

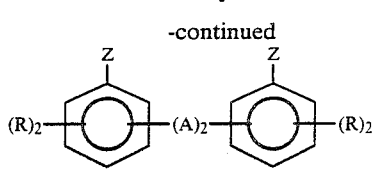

II.

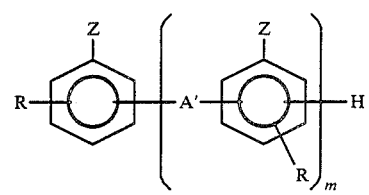

III.

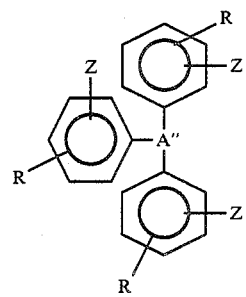

IV.

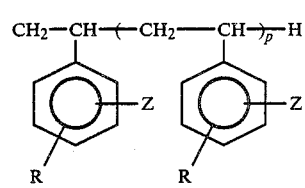

V.

wherein each A is independently a divalent hydrocarbon group having from 1 to about 12, preferably from 1 to about 6 carbon atoms, —O—, —S—, —S—S—, —SO—, —SO$_2$— or —CO—; A' is a divalent hydrocarbon group having from 1 to about 6, preferably from 1 to about 4, carbon atoms: A" is a trivalent hydrocarbon group having from 1 to about 12, preferably from 1 to about 6, carbon atoms each R is independently hydrogen, a hydrocarbyl group having from 1 to about 10, preferably from 1 to about 4, carbon atoms, a halogen atom, preferably chlorine or bromine or a hydroxyl group or an amino group: each Z is independently —OH, —NH$_2$ or —COOH; p has a value of from about 1 to about 100, preferably from about 2 to about 50; m has a value from about 1.00 to about 6 and n has a value of zero or 1.

Also suitable as compounds having at least one aromatic hydroxyl, aromatic amine or carboxyl group per molecule are those represented by the following formulas VI, VII or VIII

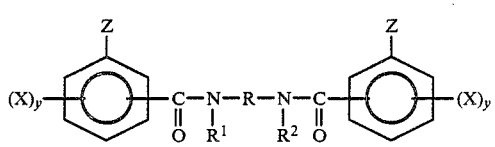

VI.

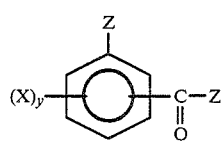

VII.

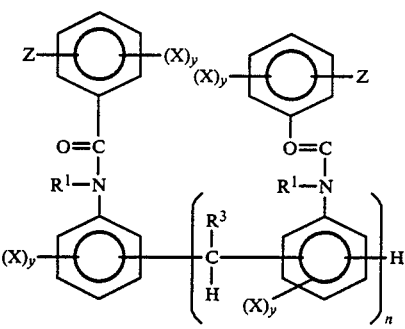

VIII.

wherein each R is a divalent hydrocarbyl group having from 1 to about 18, preferably from about 2 to about 12 and most preferably from about 2 to about 6 carbon atoms, a group represented by the following formulas IX, X, XI or XII

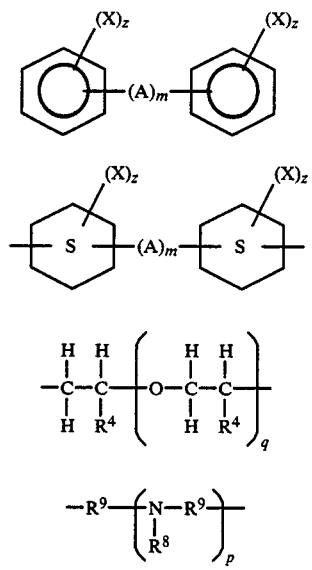

IX.

X.

XI.

XII.

or R can combine with $R^1$ so as to form a stable heterocyclic ring with the nitrogen atoms; each A is independently a divalent hydrocarbyl group having from 1 to about 10, preferably from 1 to about four carbon atoms, —O—, —S—, —S—S—, —CO—, —SO—, or —$SO_2$—; each $R^1$ is independently hydrogen, a 2,3-epoxypropyl group, a 2-alkyl-2,3-epoxypropyl group, a monovalent hydrocarbyl group or a hydroxyl substituted monovalent hydrocarbyl group, said hydrocarbyl groups having from 1 to about 9 carbon atoms, said alkyl having from 1 to about 4, preferably 1 to about 3 carbon atoms: each $R^2$ is independently hydrogen or an alkyl group having from 1 to about 4, preferably 1 to about 3 carbon atoms; each $R^3$ is independently hydrogen or an alkyl group having from 1 to about 4 carbon atoms; each $R^4$ is independently hydrogen, a hydrocarbyl or halogen substituted hydrocarbyl group having from 1 to about 9, preferably from 1 to about 2 carbon atoms; each $R^8$ is independently selected from the same groups as $R^1$ except that $R^8$ cannot be a hydrogen; each $R^9$ is independently a divalent hydrocarbyl group having from 2 to 4, preferably 2 carbon atoms; each Z is independently —OH, —NH or —COOH; each X is independently hydrogen, chlorine, bromine or a hydrocarbyl or a hydrocarbyloxy group having from 1 to about 9, preferably 1 to about 6 carbon atoms; each m independently has a value of zero or 1; n has an average value of from about 0.01 to about 6, preferably 0.1 to about 4; p has an average value of from 1 to about 10, preferably from 1 to about 3; q has an average value of at least 1, preferably from 1 to about 150, most preferably from 1 to about 100 and usually from 1 to about 10 and each y and z independently has a value of 1 or 2.

Also suitable are polycyclopentadiene polyphenols or aromatic polyamines represented by the following formula XIII

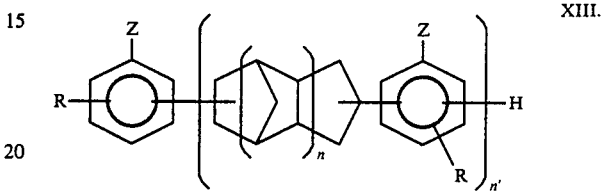

XIII.

wherein Z is —OH, —NH or —COOH; n has a value from 1 to about 5; n' has a value of from about 1 to about 10, preferably from 3 to about 6; each R is independently hydrogen, a hydrocarbyl group having from 1 to about 10, preferably from 1 to about 4 carbon atoms, a halogen atom, preferably chlorine or bromine, or a hydroxyl group or an amino group.

Suitable such polycyclopentadiene polyphenols and methods for their preparation can be found in U.S. Pat. No. 4,390,680 issued to Donald L. Nelson on June 28, 1983 which is incorporated herein by reference. The polycyclopentadiene aromatic polyamines can be prepared in a similar manner by substituting an aromatic amine for the phenolic compound.

Also suitable are compounds containing both at least one aromatic hydroxyl group and at least one aromatic amine group such as, for example, hydroxyl aniline, aminoxylenol and the like.

Suitable epihalohydrins which can be employed herein include those represented by the following formula

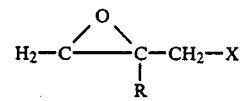

wherein R is hydrogen or a hydrocarbyl group having from 1 to about 4 carbon atoms and X is a halogen, preferably chlorine or bromine.

Particularly suitable epihalohydrins include, for example, epichlorohydrin, epibromohydrin, epiiodohydrin, methylepichlorohydrin, methylepibromohydrin, methylepiiodohydrin, combinations thereof and the like.

Suitable alkali metal hydroxides which can be employed herein include, for example, sodium hydroxide potassium hydroxide, lithium hydroxide or mixtures thereof. The alkali metal hydroxide is employed as an aqueous solution, usually at a concentration of from about 20 to about 60, suitably from about 20 to about 55, more suitably from about 30 to about 55, most suitably from about 40 to about 50 percent by weight.

The amount of alkali metal hydroxide which can be employed in the process of the present invention is from about 0.80 mole to about 1.2 mole of alkali metal hydroxide, preferably from about 0.90 mole to 1.0 mole per each aromatic hydroxyl group, aromatic amine hydrogen or —COOH group.

The alkali metal hydroxide can be added either continuously or incrementally, but never is all of the alkali metal hydroxide added in one increment.

Suitable solvents which can be employed herein include any solvent which does not react with any component in the reaction mixture, is partially or wholly miscible with water, forms a codistillate with the epihalohydrin and water and the distillate has a boiling point below that of the lowest boiling component of the reaction mixture at the pressure employed or an organic solvent which has a boiling point above the boiling point of any codistillate formed by water and epihalohydrin at the reaction temperature and pressure. Suitable such solvents include primary and secondary alcohols such as, for example, 1-methoxy-2-hydroxy propane, 1-butoxy-2hydroxy ethane, cyclohexanol, and the like. The secondary alcohols are preferred.

The amount of solvent which can be employed will depend on the particular solvent and hydroxyl or amino compound being employed. The solvent generally ranges from about 5 to about 50 weight percent, suitably from about 10 to about 40, more suitably from about 10 to about 30, most suitably from about 10 to about 25, weight percent based on the total weight of reactants.

The solid materials can be removed from the reaction mixture by any suitable mechanical means such as, for example, filtration, centrifugation or a combination thereof. A particularly suitable mechanical device is a vertical basket centrifuge model no. PUR-1200W available from Ferrum Ltd., Rupperswill, Switzerland.

The epoxy resin can be recovered from the resin-/epihalohydrin/organic solvent mixture by any suitable means, such as for example, distillation. It is preferred to remove the excess epihalohydrin and organic solvent from the epoxy resin by falling film distillation.

The following examples are illustrative of the invention, but are not to be construed as to limiting the scope thereof.

EXAMPLE 1

Into a one liter reaction vessel equipped with temperature and pressure control and indicating means, a means for the continuous or intermittent addition of aqueous sodium hydroxide, a means for condensing and separating water from a codistillate mixture of water, solvent and epichlorohydrin and a means for returning the solvent and epichlorohydrin to the reaction vessel was added 114 grams (1 equiv.) of bisphenol A, 555 grams (6 moles) of epichlorohydrin and 29.2 grams (5 wt. % based upon epichlorohydrin) of propylene glycol methyl ether. The contents were stirred at atmospheric pressure to achieves a complete solution The solution was heated to 65° C. under a reduced pressure of 168 mm Hg absolute. To the heated solution was added 80 grams (1 equiv) of a 50% aqueous solution of sodium hydroxide at a constant rate over a period of 2 hours (7,200 s). During this addition of the sodium hydroxide solution, water, epichlorohydrin and propylene glycol methyl ether were codistilled from the reaction mixture and condensed. The condensate formed two distinct phases. The organic (bottom) phase was continuously returned to the reaction mixture while the aqueous (top) phase was removed. The reaction mixture was sampled periodically for water analysis and the pressure adjusted so that the water concentration remained at 1 to 1.5 percent by weight based upon the reaction mixture. After completion of the sodium hydroxide addition, the reaction mixture was digested at 65° C. and 168 mm Hg absolute for another 15 minutes (900 s). The conversion at this point was 99.95% based upon the phenolic hydroxyl concentration. Drying of the reaction mixture was then accomplished by applying more vacuum to approximately 80 mm Hg absolute Approximately 10% by volume of the reaction mixture was boiled out to achieve a water concentration of 0.2% by weight in the reaction mixture The reaction mixture was then immediately filtered with vacuum suction to remove the insoluble salt and polymer from the resin/epichlorohydrin/propylene glycol methyl ether mixture. The resulting filtrate was a clear solution containing <1 ppm (part per million by weight) ionic chloride. Approximately 100 grams of water was added to wash the epihalohydrin/resin/propylene glycol methyl ether solution in a separatory funnel. The phase separation was rapid and no insoluble polymer was observed. The organic phase was then filtered again and the water removed from the filtrate by flash distillation in a rotary distillation flask. The final stripping conditions to remove the epihalohydrin/solvent were 160° C., <10 mm Hg absolute and a 100 cc/minute (1.67 cc/s) nitrogen purge for 30 minutes (1800 s). The resulting epoxy resin had 24 ppm hydrolyzable chloride, 1,113 ppm total chloride, 24.15% epoxide, 8,016 cps (8.016 Pa.s) viscosity at 25° C. Gas chromatography analysis for epihalohydrin hydrolysis product indicated an epihalohydrin yield of 98.4%. Total processing time was 6 hours (21,600 s).

EXAMPLE 2

Into a one liter reaction vessel equipped with temperature and pressure control and indicating means, a means for the continuous or intermittent addition of aqueous sodium hydroxide, a means for condensing and separating water from a codistillate mixture of water, solvent and epichlorohydrin and a means for returning the solvent and epichlorohydrin to the reaction vessel was added 114 grams (1 equiv.) of bisphenol A, 462.6 grams (5 moles) of epichlorohydrin and 51.4 grams (10 wt. % based upon epichlorohydrin) of propylene glycol methyl ether. The contents were stirred at atmospheric pressure to achieves a complete solution. The solution was heated to 65° C. under a reduced pressure of 165 mm Hg absolute. To the heated solution was added 79.2 grams (0.99 equiv) of a 50% aqueous solution of sodium hydroxide at a constant rate over a period of 2.5 hours (9000 s). During this addition of the sodium hydroxide solution, water, epichlorohydrin and propylene glycol methyl ether were codistilled from the reaction mixture and condensed. The condensate formed two distinct phases. The organic (bottom) phase was continuously returned to the reaction mixture while the aqueous (top) phase was removed. The reaction mixture was sampled periodically for water analysis and the pressure adjusted so that the water concentration remained at 0.9 to 1.0 percent by weight based upon the reaction mixture. After completion of the sodium hydroxide addition, the reaction mixture was digested at 65° C. and 170 mm Hg absolute for another 15 minutes (900 s). The conversion at this point was 99.90% based upon the phenolic hydroxyl concentration. Drying of the reaction mixture was then accomplished by applying more vacuum to approximately 80 mm Hg absolute. Approximately 10% by volume of the reaction mixture was boiled out to achieve a water concentration of 0.2% by weight in the reaction mixture. The reaction mixture was then immediately filtered with vacuum suction to remove the insoluble salt and polymer from the resin/epichlorohydrin/propylene glycol methyl ether mixture. The resulting filtrate was a clear solution containing <1 ppm (part per million by weight) ionic chloride. Approximately 100 grams of water was added to wash the epihalohydrin/resin/propylene glycol methyl ether solution in a separatory funnel. The phase separation was rapid and no insoluble polymer was observed. The organic phase was then filtered again and the water removed from the filtrate by flash distillation in a rotary distillation flask. The final stripping conditions to remove the epihalohydrin/solvent were 160° C., <10 mm Hg absolute and a 100 cc/minute (1.67 cc/s) nitrogen purge for 30 minutes (1800 s). The resulting epoxy resin had 67 ppm hydrolyzable chloride, 1214 ppm total chloride, 24.12% epoxide, 8409 cps (8.409 Pa.s) viscosity at 25° C. Gas chromatography analysis for epihalohydrin hydrolysis product indicated an epihalohydrin yield of 90.0%. Total processing time was 6 hours (21600 s).

EXAMPLE 3

Into a one liter reaction vessel equipped with temperature and pressure control and indicating means, a means for the continuous or intermittent addition of aqueous sodium hydroxide, a means for condensing and separating water from a codistillate mixture of water, solvent and epichlorohydrin and a means for returning the solvent and epichlorohydrin to the reaction vessel was added 114 grams (1 equiv.) of bisphenol A, 462.6 grams (5.0 moles) of epichlorohydrin and 198 grams (30 wt. % based upon epichlorohydrin) of propylene glycol methyl ether. The contents were stirred at atmospheric pressure to achieves a complete solution. The solution was heated to 65° C. under a reduced pressure of 180 mm Hg absolute. To the heated solution was added 80 grams (1.00 equiv) of a 50% aqueous solution of sodium hydroxide at a constant rate over a period of 1.5 hours (5400 s). During this addition of the sodium hydroxide solution, water, epichlorohydrin and propylene glycol methyl ether were codistilled from the reaction mixture and condensed. The condensate formed two distinct phases. The organic (bottom) phase was continuously returned to the reaction mixture while the aqueous (top) phase was removed. The reaction mixture was sampled periodically for water analysis and the pressure adjusted so that the water concentration remained at 2.0 to 2.5 percent by weight based upon the reaction mixture. After completion of the sodium hydroxide addition, the reaction mixture was digested at 65° C. and 165 mm Hg absolute for another 15 minutes (900 s). The conversion at this point was 99.99% based upon the phenolic hydroxyl concentration. Drying of the reaction mixture was then accomplished by applying more vacuum to approximately 75 mm Hg absolute. Approximately 15% by volume of the reaction mixture was boiled out to achieve a water concentration of 0.3% by weight in the reaction mixture. The reaction mixture was then immediately filtered with vacuum suction to remove the insoluble salt and polymer from the resin/epichlorohydrin/propylene glycol methyl ether mixture. The resulting filtrate was a clear solution containing 2.5 ppm (part per million by weight) ionic chloride. Approximately 100 grams of water was added to wash the epihalohydrin/resin/propylene glycol methyl ether solution in a separatory funnel. The phase separation was slow and no insoluble polymer was observed. The organic phase was then filtered again and the water removed from the filtrate by flash distillation in a rotary distillation flask. The final stripping conditions to remove the epihalohydrin/solvent were 160° C., <10 mm Hg absolute and a 100 cc/minute (1.67 cc/s) nitrogen purge for 30 minutes (1800 s). The resulting epoxy resin had 194 ppm hydrolyzable chloride, 1350 ppm total chloride, 24.10% epoxide, 8337 cps (8.337 Pa.s) viscosity at 25° C. Gas chromatography analysis for epihalohydrin hydrolysis product indicated an epihalohydrin yield of 95.0%. Total processing time was 8 hours (28800 s).

EXAMPLE 4

Into a one liter reaction vessel equipped with temperature and pressure control and indicating means, a means for the continuous or intermittent addition of aqueous sodium hydroxide, a means for condensing and separating water from a codistillate mixture of water, solvent and epichlorohydrin and a means for returning the solvent and epichlorohydrin to the reaction vessel was added 114 grams (1 equiv.) of bisphenol A, 416 grams (4.5 moles) of epichlorohydrin and 46.2 grams (10 wt. % based upon epichlorohydrin) of propylene glycol methyl ether. The contents were stirred at atmospheric pressure to achieves a complete solution. The solution was heated to 65° C. under a reduced pressure of 170 mm Hg absolute. To the heated solution was added 78.4 grams (0.98 equiv) of a 50% aqueous solution of sodium hydroxide at a constant rate over a period of 2.75 hours (9900 s). During this addition of the sodium hydroxide solution, water, epichlorohydrin and propylene glycol methyl ether were co-distilled from the reaction mixture and condensed. The condensate formed two distinct phases. The organic (bottom) phase was continuously returned to the reaction mixture while the aqueous (top) phase was removed. The reaction mixture was sampled periodically for water analysis and the pressure adjusted so that the water concentration remained at 0.7 to 1.0 percent by weight based upon the reaction mixture. After completion of the sodium hydroxide addition, the reaction mixture was digested at 65° C. and 168 mm Hg absolute for another 15 minutes (900 s). The conversion at this point was 99.89% based upon the phenolic hydroxyl concentration. Drying of the reaction mixture was then accomplished by applying more vacuum to approximately 80 mm Hg absolute. Approximately 10% by volume of the reaction mixture was boiled out to achieve a water concentration of 0.2% by weight in the reaction mixture. The reaction mixture was then immediately filtered with vacuum suction to remove the insoluble salt and polymer from the resin/epichlorohydrin/propylene glycol methyl ether mixture. The resulting filtrate was a clear solution containing <1 ppm (part per million by weight) ionic chloride. Approximately 100 grams of water was added to wash the epihalohydrin/resin/propylene glycol methyl ether solution in a separatory funnel. The phase separation was rapid and no insoluble polymer was observed. The organic phase was then filtered again and the water removed from the filtrate by flash distillation in a rotary distillation flask. The final stripping conditions to remove the epihalohydrin/solvent were 100° C., <10 mm Hg absolute and a 100 cc/minute (1.67 cc/s) nitrogen purge for 30 minutes (1800 s). The resulting epoxy resin had 32 ppm hydrolyzable chloride, 1148 ppm total chloride, 23.97% epoxide, 8611 cps (8.116 Pa.s) viscosity at 25° C. Gas chromatography analysis for epihalohydrin hydrolysis product indicated an epihalohydrin yield of 98.0%. Total processing time was 7 hours (25,200 s).

EXAMPLE 5

Into a one liter reaction vessel equipped with temperature and pressure control and indicating means, a means for the continuous or intermittent addition of aqueous sodium hydroxide, a means for condensing and separating water from a codistillate mixture of water, solvent and epichlorohydrin and a means for returning the solvent and epichlorohydrin to the reaction vessel was added 114 grams (1 equiv.) of bisphenol A, 370 grams (4.0 moles) of epichlorohydrin and 158.6 grams (30 wt. % based upon epichlorohydrin) of propylene glycol methyl ether. The contents were stirred at atmospheric pressure to achieves a complete solution The solution was heated to 65° C. under a reduced pressure of 165 mm Hg absolute To the heated solution was added 80 grams (1.00 equiv) of a 50% aqueous solution of sodium hydroxide at a constant rate over a period of 3 hours (10,800 s). During this addition of the sodium hydroxide solution, water, epichlorohydrin and propylene glycol methyl ether were co-distilled from the reaction mixture and condensed. The condensate formed two distinct phases. The organic (bottom) phase was continuously returned to the reaction mixture while the aqueous (top) phase was removed. The reaction mixture was sampled periodically for water analysis and the pressure adjusted so that the water concentration remained at 1.0 to 1.5 percent by weight based upon the reaction mixture. After completion of the sodium hydroxide addition, the reaction mixture was digested at 65° C. and 165 mm Hg absolute for another 15 minutes (900 s). The conversion at this point was 99.99% based upon the phenolic hydroxyl concentration. Drying of the reaction mixture was then accomplished by applying more vacuum to approximately 80 mm Hg absolute. Approximately 20% by volume of the reaction mixture was boiled out to achieve a water concentration of 0.2% by weight in the reaction mixture. The reaction mixture was then immediately filtered with vacuum suction to remove the insoluble salt and polymer from the resin/epichlorohydrin/propylene glycol methyl ether mixture. The resulting filtrate was a clear solution containing 2.0 ppm (part per million by weight) ionic chloride. Approximately 100 grams of water was added to wash the epihalohydrin/resin/propylene glycol methyl ether solution in a separatory funnel. The phase separation was slow and no insoluble polymer was observed. The organic phase was then filtered again and the water removed from the filtrate by flash distillation in a rotary distillation flask. The final stripping conditions to remove the epihalohydrin/solvent were 160° C., <10 mm Hg absolute and a 100 cc/minute (1.67 cc/s) nitrogen purge for 30 minutes (1800 s). The resulting epoxy resin had 89 ppm hydrolyzable chloride, 1050 ppm total chloride, 23.80% epoxide, 9800 cps (9.800 Pa.s) viscosity at 25° C. Gas chromatography analysis for epihalohydrin hydrolysis product indicated an epihalohydrin yield of 96%. Total processing time was 9.0 hours (32400 s).

COMPARATIVE EXPERIMENT A

The procedure of Example 1 was essentially duplicated except that:

1. No drying of the reaction mixture was carried out at the end of the sodium hydroxide addition.
2. Carbon dioxide was added to neutralize residual sodium hydroxide after the digestion period.
3. Epichlorohydrin was distilled with all of the sodium chloride present which required ~2 hours (~7,200 s) for complete removal of the epichlorohydrin. No filtration was performed after drying and digestion.
4. MIBK (methyl isobutyl ketone), 680 grams, was added to the salt/resin mixture and held at 60° C. for 30 minutes (1,800 s) with good agitation to dissolve the resin.
5. Two hundred-fifty grams of water was added to the resin/MIBK mixture to wash out the salt in a separatory funnel. The separation was poor with insoluble polymer at the interface and in the aqueous phase. Ionic chloride in the organic phase was 396 ppm. Four additional washes were performed but the ionic chloride concentration after the fifth wash was 11 ppm.
6. Coalescing was needed to reduce ionic chloride of the resin/MIBK solution to <1 ppm. The resin/MIBK solution was then distilled in a rotary evaporator to terminal conditions of 160° C., <10 mm Hg absolute, 100 cc/min (1.67 cc/s) nitrogen purge for 30 minutes (1,800 s). The resultant epoxy resin was found to contain 426 ppm hydrolyzable chloride, 1621 ppm total chloride, 23.8% epoxide and a viscosity of 7858 cps (7.858 Pa.s) at 25° C. Total processing time was 12 hours.

We claim:

1. In a process for the preparation of epoxy resins which consists essentially of reacting at least a molar excess of at least one epihalohydrin with at least one aromatic compound containing an active hydrogen atom reactive with an epihalohydrin in the presence of at least one organic solvent, an alkali metal hydroxide and optionally in the presence of a catalyst for the reaction between the aromatic active hydrogen-containing compound and the epihalohydrin while controlling the concentration of water in the reaction mixture to less than about 6% by weight; the improvement wherein
    (1) after completion of the reaction, drying the reaction mixture at conditions which do not remove substantial quantities of unreacted epihalohydrin until the concentration of water is equal to or less than about 2 percent by weight;
    (2) removing insoluble materials from the reaction mixture by any suitable mechanical solid separation means thereby forming a resin/epihalohydrin/organic solvent mixture essentially free of insoluble material;
    (3) washing the resin/epihalohydrin/organic solvent mixture with water, so as to remove water soluble materials;
    (4) drying the resin/epihalohydrin/organic solvent mixture to a water content equal to or less than about 2 percent by weight;
    (5) and recovering the resultant epoxy resin from the resin/epihalohydrin/organic solvent mixture by any suitable means.
2. A process of claim 1 wherein
    (a) water is removed from the reaction mixture during the reaction of the epihalohydrin with the aromatic active hydrogen-containing compound at a rate such that the concentration of water in the reaction mixture is from about 0.3 to about 5 percent by weight;

(b) the optional catalyst is not employed;

(c) the reaction mixture is dried prior to removing insoluble materials, step (1), to the extent that the concentration of water in the resin/epihalohydrin/organic solvent mixture is equal to or less than about 1.5 percent by weight;

(d) the drying, step (4), which is performed after washing with water is conducted until the water content in the resin/epihalohydrin/organic solvent mixture is equal to or less than about 1.5 percent by weight; and (e) the epoxy resin is recovered from the resin/epihalohydrin/organic solvent mixture, step (5), by distilling the epihalohydrin and organic solvent from the resin.

3. A process of claim 2 wherein (a) the reaction is conducted at a temperature of from about 45° C. to about 75° C.;

(b) water is removed from the reaction mixture during the reaction of the epihalohydrin with the aromatic active hydrogen-containing compound at a rate such that the concentration of water in the reaction mixture is from about 0.5 to about 4 percent by weight;

(c) the reaction mixture is dried prior to removing insoluble materials, step (1), to the extent that the concentration of water in the resin/epihalohydrin/organic solvent mixture is equal to or less than about 1 percent by weight;

(d) the drying, step (4), which is performed after washing with water is conducted until the water content in the resin/epihalohydrin/organic solvent mixture is equal to or less than about 1 percent by weight; and (e) the epoxy resin is recovered from the resin/epihalohydrin/organic solvent mixture, step (5), by distilling the epihalohydrin and organic solvent from the resin by means of a rotary evaporator or a falling film still.

4. A process of claim 3 wherein (a) the reaction is conducted at a temperature of from about 50° C. to about 70° C.;

(b) water is removed from the reaction mixture during the reaction of the epihalohydrin with the aromatic active hydrogen-containing compound at a rate such that the concentration of water in the reaction mixture is from about 0.8 to about 2 percent by weight;

(c) the reaction mixture is dried prior to removing insoluble materials, step (1), to the extent that the concentration of water in the resin/epihalohydrin/organic solvent mixture is equal to or less than about 0.2 percent by weight;

(d) the insoluble materials are removed, step (2), by filtration or centrifugation or a combination thereof; and (e) the drying, step (4), which is performed after washing with water is conducted until the water content in the resin/epihalohydrin/solvent mixture is equal to or less than about 0.2 percent by weight.

5. A process of claims 1, 2, 3 or 4 wherein (a) said epihalohydrin is epichlorohydrin;

(b) said compound containing at least one active hydrogen atom reactive with an epihalohydrin is an aromatic hydroxyl-containing compound, an aromatic primary amine containing compound, a carboxyl group containing compound or a combination thereof;

(c) said alkali metal hydroxide is sodium hydroxide; and (d) said organic solvent is a glycol ether.

6. A process of claim 5 wherein said compound containing at least one active hydrogen atom reactive with an epihalohydrin is an aromatic hydroxyl-containing compound.

7. A process of claim 6 wherein said compound containing at least one active hydrogen atom reactive with an epihalohydrin is a bisphenol or a phenol-formaldehyde novolac resin or a cresol-formaldehyde novolac resin.

8. A process of claim 7 wherein said compound containing at least one active hydrogen atom reactive with an epihalohydrin is bisphenol A and said glycol ether is propylene glycol methyl ether.

9. A process for the preparation of epoxy resins which comprises (A) continuously or incrementally adding an aqueous alkali metal hydroxide solution over a period of from about 0.5 to about 20 hours to a mixture containing (1) at least one aromatic compound containing at least one active hydrogen atom reactive with an epihalohydrin, (2) at least a molar excess of at least one epihalohydrin and (3) at least one organic solvent which codistills with water and epihalohydrin at a temperature below the boiling point of the lowest boiling compound among the components in the reaction mixture or which solvent boils at a temperature higher than the temperature at which water and epihalohydrin codistill;

(B) conducting the reaction under a reduced pressure sufficient to provide a distillate with a boiling point of from about 35° C. to about 90° C., continuously removing water by means of codistillation at a rate such that the water content in the reaction mixture is less than about 6 percent by weight;

(C) separating the water from the distillate and returning the epihalohydrin and organic solvent to the reaction mixture;

(D) drying the reaction mixture at conditions which do not remove substantial quantities of unreacted epihalohydrin until the concentration of water is equal to or less than about 2 percent by weight;

(E) removing insoluble materials from the reaction mixture by any suitable mechanical solid separation means thereby forming a resin/epihalohydrin/organic solvent mixture essentially free of insoluble material;

(F) washing the resin/epihalohydrin/organic solvent mixture with water, so as to remove water soluble materials;

(G) drying the resin/epihalohydrin/organic solvent mixture to a water content equal to or less than about 2 percent by weight;

(H) and recovering the resultant epoxy resin from the resin/epihalohydrin/organic solvent mixture by any suitable means.

10. A process of claim 9 wherein (a) the aqueous alkali metal hydroxide solution is intermittently or continuously added over a period of from about 1 to about 10 hours;

(b) the reaction is conducted at a temperature of from about 40° C. to about 85° C.;

(c) water is removed at a rate such that the concentration of water in the reaction mixture is from about 0.3 to about 5 percent by weight;

(d) the reaction mixture is dried prior to removing insoluble materials to the extent that the concentration of water in the resin/epihalohydrin/organic solvent mixture is equal to or less than about 1.5 percent by weight;
(e) the drying step, (G), which is performed after washing with water is conducted until the water content in the resin/epihalohydrin/organic solvent mixture is equal to or less than about 1.5 percent by weight; and
(f) the epoxy resin is recovered from the resin/epihalohydrin/organic solvent mixture by distilling the epihalohydrin and organic solvent from the resin.

11. A process of claim 10 wherein
(a) the aqueous alkali metal hydroxide solution is intermittently or continuously added over a period of from about 1 to about 6 hours;
(b) the reaction is conducted at a temperature of from about 45° C. to about 75° C.;
(c) water is removed at a rate such that the concentration of water in the reaction mixture is from about 0.5 to about 4 percent by weight;
(d) the reaction mixture is dried prior to removing insoluble materials to the extent that the concentration of water in the resin/epihalohydrin/organic solvent mixture is equal to or less than about 1 percent by weight;
(e) the drying step, (G), which is performed after washing with water is conducted until the water content in the resin/epihalohydrin/organic solvent mixture is equal to or less than about 1 percent by weight; and
(f) the epoxy resin is recovered from the resin/epihalohydrin/organic solvent mixture by distilling the epihalohydrin and organic solvent from the resin by means of a rotary evaporator or a falling film still.

12. A process of claim 11 wherein
(a) the aqueous alkali metal hydroxide solution is intermittently or continuously added over a period of from about 1.5 to about 3 hours;
(b) the reaction is conducted at a temperature of from about 50° C. to about 70° C.;
(c) water is removed at a rate such that the concentration of water in the reaction mixture is from about 0.8 to about 2 percent by weight;
(d) the reaction mixture is dried prior to removing insoluble materials to the extent that the concentration of water in the resin/epihalohydrin/organic solvent mixture is equal to or less than about 0.2 percent by weight;
(v) the insoluble materials are removed by filtration or centrifugation; and
(vi) the drying step, (G), which is performed after washing with water is conducted until the water content in the resin/epihalohydrin/solvent mixture is equal to or less than about 0.2 percent by weight.

13. A process of claims 9, 10, 11 or 12 wherein
(a) said epihalohydrin is epichlorohydrin;
(b) said compound containing at least one active hydrogen atom reactive with an epihalohydrin is an aromatic hydroxyl-containing compound, an aromatic primary amine containing compound, a carboxyl group containing compound or a combination thereof;
(c) said alkali metal hydroxide is sodium hydroxide; and
(d) said organic solvent which codistills with water and epihalohydrin is a glycol ether.

14. A process of claim 13 wherein said compound containing at least one active hydrogen atom reactive with an epihalohydrin is an aromatic hydroxyl-containing compound.

15. A process of claim 14 wherein said compound containing at least one active hydrogen atom reactive with an epihalohydrin is a bisphenol or a phenol-formaldehyde novolac resin or a cresol-formaldehyde novolac resin.

16. A process of claim 15 wherein said compound containing at least one active hydrogen atom reactive with an epihalohydrin is bisphenol A and said glycol ether is propylene glycol methyl ether.

* * * * *